United States Patent [19]

Loppnow

[11] Patent Number: 5,003,656
[45] Date of Patent: Apr. 2, 1991

[54] MULTIPURPOSE BICYCLE TOOL

[76] Inventor: Duane Loppnow, 772 Casiano Dr., Santa Barbara, Calif. 93105

[21] Appl. No.: 482,514

[22] Filed: Feb. 21, 1990

[51] Int. Cl.⁵ .............................................. B25F 1/00
[52] U.S. Cl. ........................................ 7/169; 7/170; 29/267; 248/231.8; 248/316.7
[58] Field of Search .......................... 7/100, 169, 170; 29/267, 243.5; 81/DIG. 7; D8/16, 31, 105; 248/231.8, 316.7; 59/5, 7

[56] References Cited

U.S. PATENT DOCUMENTS

| D. 45,644 | 4/1914 | Michelin | 7/100 |
|---|---|---|---|
| 546,521 | 9/1895 | Gatti | 7/169 |
| 635,067 | 10/1899 | White | 248/231.8 |
| 1,581,119 | 4/1926 | Herring | 7/169 |
| 4,103,378 | 8/1978 | Granados | 7/138 |

FOREIGN PATENT DOCUMENTS 973089  2/1951  France .................. 248/231.8

Primary Examiner—Roscoe V. Parker
Attorney, Agent, or Firm—Milton S. Gerstein

[57] ABSTRACT

A bicycle tool is provided with a main elongated body section defining oppositely-disposed front and rear flat surfaces, and a oppositely-disposed side edge surfaces. The lower or inner end of the main body section has projecting from the two side edges thereof a pair of concave gripping or mounting members, which together define a clamp-like element for directly mounting the tool to a rod or shaft of a bicycle frame, so that the tool is readily and continually available to the bicycle rider, when needed. From the upper or outer end of the main body section, projecting from opposing side edge surfaces of the main body section, there are first and second projections or ears, one of which is used for re-railing a chain that has become derailed, while the second ear cooperates with a third ear or projection protruding from the same respective side edge surface as the second ear but adjacent the lower or inner end of the main body section, which spaced-apart second and third ears are used for gripping different links of a bicycle chain, so as to allow for the removal of one or more intermediate links positioned between the second and third ears, during a chain-shortening procedure. Projecting from the lower or inner end of the main body section is a bicycle-tire insertion and removal aid.

19 Claims, 2 Drawing Sheets

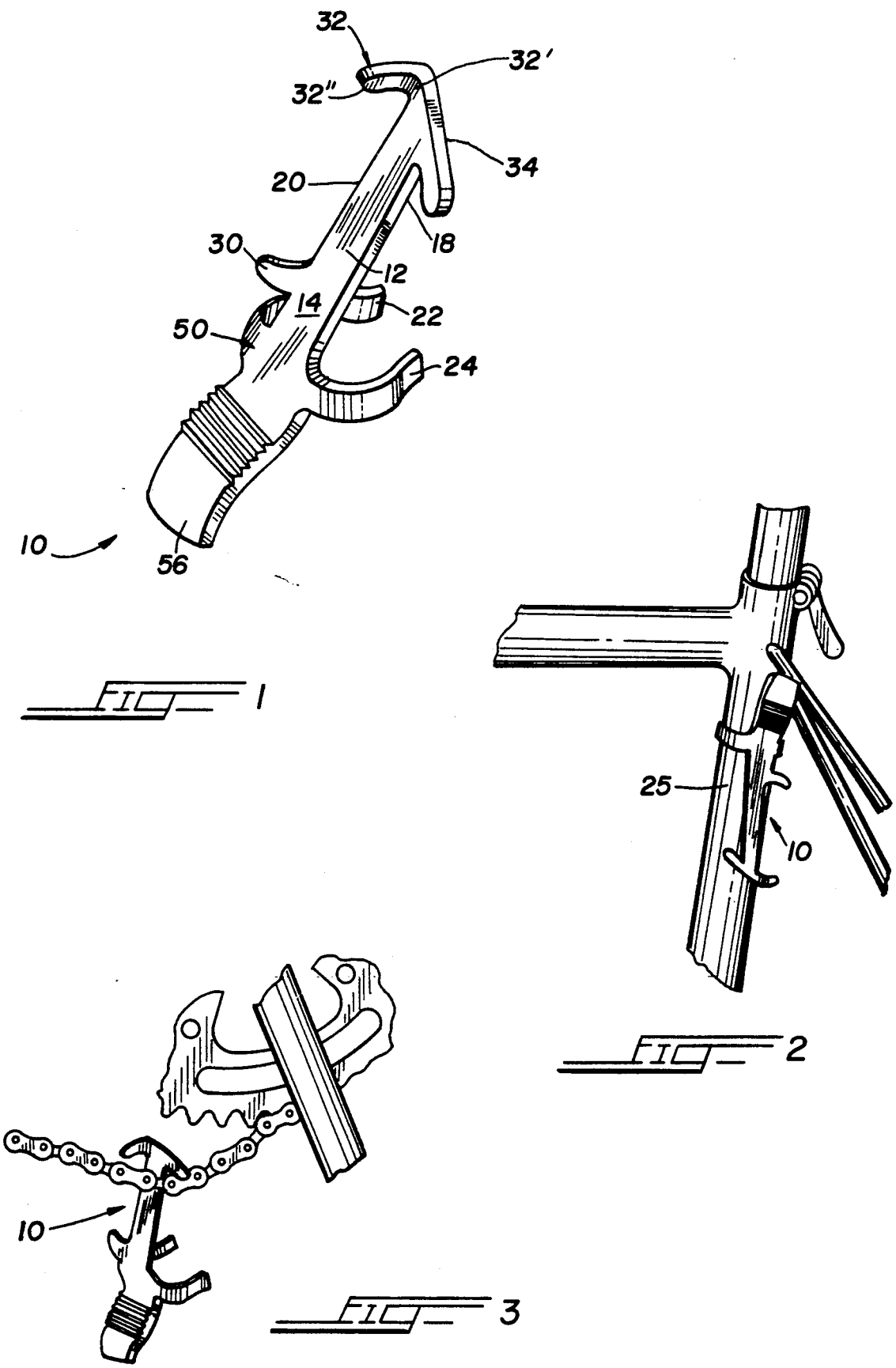

5,003,656

MULTIPURPOSE BICYCLE TOOL

BACKGROUND OF THE INVENTION

The present invention is directed to a bicycle tool having multifarious functions. Specific problems that often occur in bicycles, such as chain-derailment, chain-shortening, and tire replacement, are all addressed by the tool of the present invention. It is common for a chain of a bicycle to become derailed, or removed, from its operative engagement with the gearing of a bicycle. It is also commonly required, when mounting a new chain on the gearing of a bicycle, to remove one or more links thereof to fit the specific type and size of bicycle. It is also common to have to replace a flat or worn tire by prying off the old tire and inserting a new one on the bicycle wheel-rim. The tool of the present invention may be used in all of the above-mentioned situations for assisting a person in achieving his desired task.

SUMMARY OF THE INVENTION

It is the primary objective of the present invention to provide a bicycle tool that may be used to perform multiple tasks commonly required in maintaining a bicycle.

It is another objective of the present invention to provide such a multi-purpose bicycle tool that is readily available for use, via its direct mounting to a portion of the bicycle frame.

Toward these and other ends, the bicycle tool of the invention is provided with a main elongated body section defining oppositely-disposed front and rear flat surfaces, and a oppositely-disposed side edge surfaces. The lower or inner end of the main body section has projecting from the rear surface thereof a pair of concave gripping or mounting members, which together define a clamp-like element for directly mounting the tool to a rod or shaft of a bicycle frame, so that the tool is readily and continually available to the bicycle rider, when needed. From the upper or outer end of the main body section, projecting from opposing side edge surfaces of the main body section, there are first and second projections or ears, the first one being used for re-railing a chain that has become derailed, while the second ear or projection cooperates with a third ear or projection protruding from the same respective side edge surface as the second ear but adjacent the lower or inner end of the main body section, which spaced-apart second and third ears are used for gripping different links of a bicycle chain, so as to allow for the removal of one or more intermediate links positioned between the second and third ears, during a chain-shortening procedure. Projecting from the lower or inner end of the main body section is a bicycle-tire insertion and removal aid.

BRIEF DESCRIPTION OF THE DRAWING

The invention will be more readily understood with reference to the accompanying drawing, wherein:

FIG. 1 is a perspective view of the bicycle tool of the invention;

FIG. 2 is a perspective view showing the bicycle tool of the invention clamped in place on a portion of a bicycle frame for ready availability;

FIG. 3 is a perspective view showing the bicycle tool of the invention in use for re-railing a derailed bicycle chain;

DETAILED DESCRIPTION OF THE INVENTION

Figure 4:
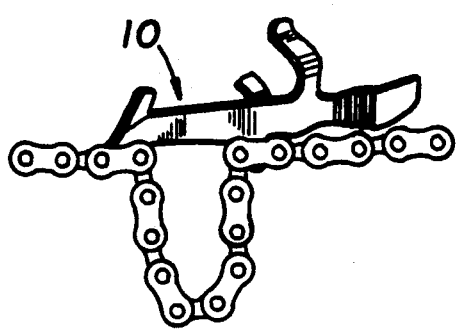
FIG. 4 is a perspective view showing the bicycle of the invention in use for providing a work-loop during a chain-shortening process where one or more chain-links are removed.
Figure 5:
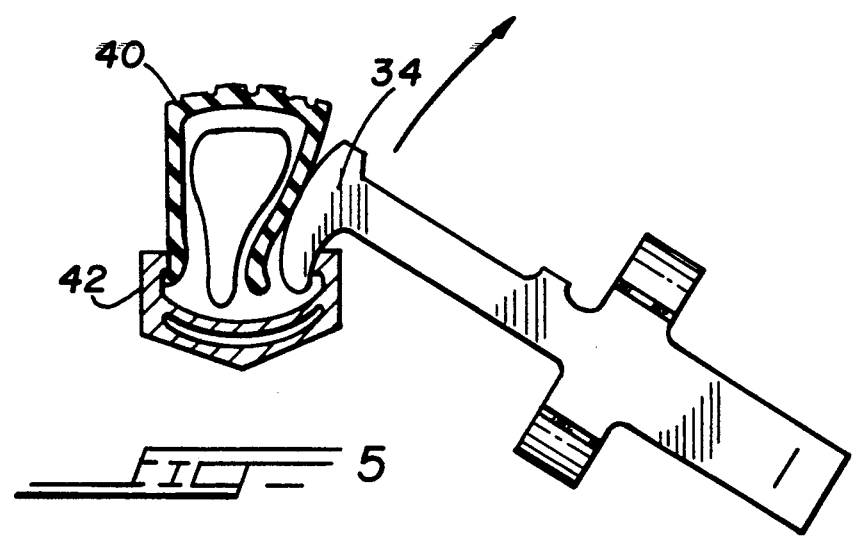
FIG. 5 is a partial cross-sectional view showing the tool of the invention in use for installing a tire onto a wheel of a bicycle.

Referring now to the drawings in greater detail, the multifunctional bicycle tool of the invention is indicated generally by reference numeral 10 in FIG. 1. The tool 10 has a main elongated body section 12 defining substantially flat front and rear surfaces 14, 16, and side edge-surfaces 18, 20. The lower or inner end portion of the main body section 12 is provided with a pair of arcuate clamping spring-fingers or clamping elements 22, 24 by which the tool 10 may be removably mounted to a shaft of a bicycle frame, in the manner depicted in FIG. 2, where the fingers 22, 24 clamp therebetween a shaft 25 of a bicycle frame, whereby the tool is readily and easily accessible when needed. The fingers or clamps 22, 24 project from respective side edge surfaces 18, 20 and rearwardly from the rear surface 16. The main body section 12 also has three projecting hooks or ears 30, 32, 34 which are used for specific tasks. The ear or hook 30 projects from the side edge surface 20, substantially in close proximity to the inner or lower end of the main body section 12, which ear or hook 30 extends an at acute angle with respect to the side edge surface 20, as clearly seen in FIGS. 1, 3 and 6. The ear or hook 30 is used, in conjunction with the ear or hook 32, for providing a work-loop during a chain-shortening process, as shown in FIG. 4, during which one or more chain-links are removed for fitting the chain to a respective bicycle. The ear or hook 32 projects at an acute angle from the side edge surface 20, but adjacent the upper or outer end of the main body section. The ear 32 is a bent projection, with a first section 32' projecting from the side edge surface 20, and a second bent section 32'', in a plane parallel to the plane of the ear or hook 30, whereby the two ears or hooks 30, 32 may grip spaced-apart links of a bicycle chain in order to allow for the formation of a work-loop, as shown in FIG. 4. The other ear or projection 34 projects from the other side edge surface 18, adjacent the outer or upper end of the main body section 12, as clearly seen in FIGS. 1 and 3, which ear 34 is used for re-railing a de-railed chain back onto the gearing of a bicycle, in the manner depicted in FIGS. 3. The ear 34 also extends at an acute angle to provide a V-recess for receiving a portion of a bicycle chain, as shown in FIG. 3, for moving the chain and re-seating it on the sprocket. The ear or projection 34 has a dual function. In addition to its use for re-railing a chain, it is also used for installing a tire, as shown in FIG. 5. The projection 34 is inserted between a tire 40 and a bicycle wheel-rim 42, in the manner shown in FIG. 5, thereby forcing the tire onto the rim. After a first portion of the tire 40 has been entrained about the rim, tool 10 is then revolved about the wheel a full 360 degrees, with the ear 34 juxtapositioned between the tire and rim, so that the remaining portions of the tire are pushed onto the wheel-rim.

Figure 6:
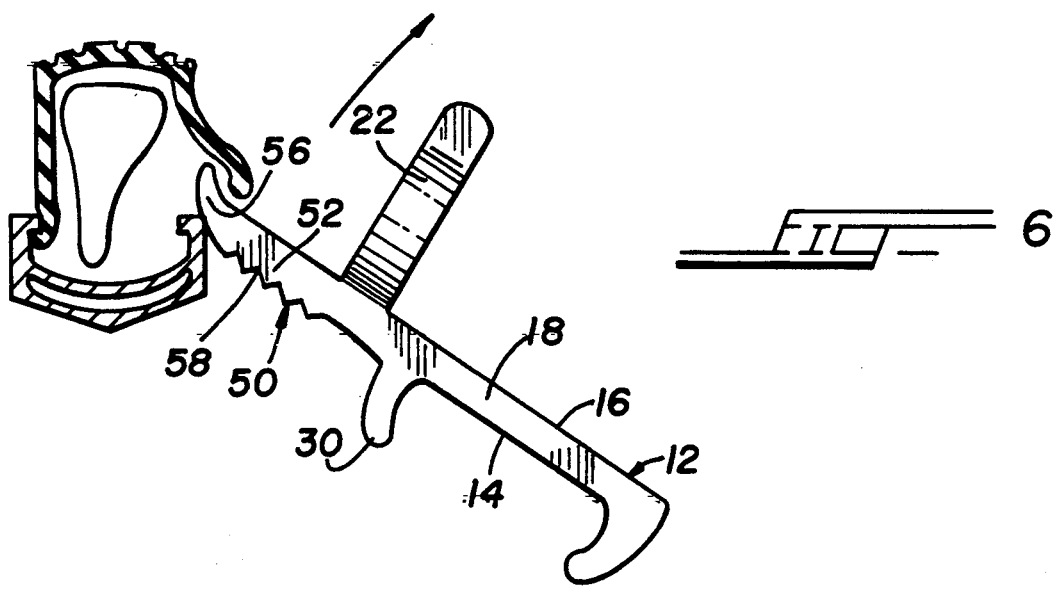
FIG. 6 is a partial cross-sectional view showing the tool of the invention in use for removing an old, worn or flat tire from a wheel of a bicycle.

The last adjunct of the tool 10 is a linear extension 50 which is used for tire-removal. The extension 50 is provided with a linear section projecting from the inner or lower end of the main body section 12, and terminates in a hook or bent section 56 which bends towards the clamping fingers, and away from the rear surface 16, as shown in FIGS. 1 and 6. The bent section is used for prying the old, worn or used tire from the rim, as shown in FIG. 6, with the entire tire being removed by moving the tool a full 360 degrees about the wheel-rim. The front surface of the linear section 50 is provided with serrations or a knurled surface 58 to provide better handgripping of the tool, the extension 50 serving as a handle for the tool 10 when one of the other functions of the tool is being utilized.

The tool may be made of any well-known metal, alloy, composite, and the like, and may assume any size, depending upon the size and shape of bicycle intended.

While a specific embodiment of the invention has been shown and described, it is to be understood that numerous changes and modifications may be made therein without departing from the scope, spirit and intent of the invention as set forth in the appended claims.

What I claim is:

1. A multifunctional tool for use with bicycles, comprising:
    a main body section;
    a first means connected to said main body section for use in replacing a derailed bicycle chain; and
    a second means connected to said main body section for use in removing at least one chain link of a bicycle chain;
    said first means comprising a first projecting ear member extending from said main body section; said second means comprising a second projecting ear member extending from said main body section, and a third projecting ear member extending from said main body section;
    said main body portion comprising an elongated member defining a front surface face, a rear surface face, a first side edge surface, and a second side edge surface, a first end and a second end; said first projecting ear extending from a first one of said surface; said second projecting ear extending from a second one of said surfaces; said third projecting ear also extending from said second one of said surfaces and spaced therealong from said second projecting ear;
    said second projecting ear comprising a bent-member having a first section connected to said second one of said surface, and a second section connected to said first section and extending at an angle with respect thereto; said third projecting ear substantially lying in the same plane as said second section of said projecting ear for gripping links of a chain therebetween.

2. The tool according to claim 1, further comprising a third means connected to said main body section for use in removing a bicycle tire from wheel-rim of the bicycle.

3. The tool according to claim 2, wherein said said third means comprises a projecting member extending from said main body section.

4. The tool according to claim 3, wherein said projecting member of said third means extends substantially linearly from said first end of said main body section.

5. The tool according to claim 4, wherein said projecting member of said third means comprises a substantially straight section terminating in a bent section, said bent section being disposed opposite to the portion of said straight member connected to said first end of said main body section.

6. The tool according to claim 5, wherein said projecting member of said third means also serves as a handle means for holding said tool, said projecting member further comprising serrations formed in a surface thereof to aid in the hand-gripping thereof when using the tool.

7. The tool according to claim 1, further comprising means for removably securing said main body section to the frame of a bicycle.

8. The tool according to claim 2, further comprising means for removably securing said main body section to the frame of a bicycle, said means for removably securing comprising a pair of oppositely-disposed arcuate arms, one said arm projecting from said rear surface substantially adjacent said first side edge surface, and the other said arm projecting from rear surface substantially adjacent said second side edge surface, said pair of arcuate arms defining a clamp for receiving therebetween a portion of a bicycle frame.

9. The tool according to claim 11, wherein said pair of arms extend from said rear surface substantially adjacent said inner end of said main body section.

10. The tool according to claim 9, wherein said projecting member of said third means extends substantially linearly from said first end of said main body section, said projecting member of said third means comprising a substantially straight section terminating in a bent section, said bent section being disposed opposite to the portion of said straight member connected to said first end of said main body section.

11. The tool according to claim 10, wherein said projecting member of said third means also serves as a handle means for holding said tool, said projecting member further comprising serrations formed in a surface thereof to aid in the hand-gripping thereof when using the tool.

12. In a bicycle comprising a frame, a wheel-rim and a tire thereon, in combination with a multifunctional tool for use with said bicycle, said tool comprising:
    a main body section;
    a first means connected to said main body section for replacing a derailed bicycle chain; said first means comprises a first projecting ear member extending from a first portion of said main body section;
    a second means connected to said main body section for removing at least one chain link of a bicycle chain; said second means comprises a second projecting ear member extending from a second portion of said main body section, and a third projecting ear member extending from a third portion of said main body section linearly spaced apart from said second portion, whereby said second and third ears may grip different and spaced-apart links of a bicycle chain during a chain-shortening procedure;
    third means for removably securing said main body section to said frame of said bicycle; and further comprising fourth means connected to said main body section for use in removing a bicycle tire from wheel-rim of the bicycle; said fourth means comprising a projecting member extending from a fourth portion of said main body section.

13. The combination according to claim 12, wherein said main body portion comprises an elongated member defining a front surface face, a rear surface face, a first side edge surface, and a second side edge surface, a first inner end and a second outer end; said first projecting ear extending from said first side edge surface substantially adjacent said second outer end; said second projecting ear extending from said second side edge surface substantially adjacent said second outer end; said third projecting ear extending from said second side edge surface spaced therealong from said second projecting ear.

14. A multifunctional tool for use with bicycles, comprising:
- a main body section;
- a first means connected to said main body section for use in replacing a derailed bicycle chain; and
- a second means connected to said main body section for use in removing at least one chain link of a bicycle chain;
- a third means connected to said main body section for use in removing a bicycle tire from wheel-rim of the bicycle;
- said first means comprising a first projecting ear member from said main body section; said second means comprising a second projecting ear member from said main body section and a third projecting ear member from said main body section; said third means comprising a fourth projecting member from said main body section;
- said main body portion comprising an elongated member defining a front surface face, a rear surface face, a first side edge surface, and a second side edge surface, a first end and a outer end;
- said fourth projecting member of said third means extending substantially linearly from said first end of said main body section.

15. The tool according to claim 14, wherein said projecting member of said third means comprises a substantially straight section terminating in a bent section, said bent section being disposed opposite to the portion of said straight member connected to said first inner end of said main body section.

16. The tool according to claim 14, wherein said projecting member of said third means also serves as a handle means for holding said tool, said projecting member further comprising serrations formed in a surface thereof to aid in the hand-gripping thereof when using the tool.

17. A method of using a bicycle tool, which tool comprises a main body section; a first means connected to said main body section for use in replacing a derailed bicycle chain; a second means connected to said main body section for use in removing at least one chain link of a bicycle chain; a third means connected to said main body section for use in removing a bicycle tire from wheel-rim of the bicycle, comprising:
- (a) manipulating said tool for positioning said first means in an operative, useful state, and utilizing said first means for replacing a derailed bicycle chain onto the gearing of a bicycle;
- (b) manipulating said tool for positioning said second means in an operative, useful state, and utilizing said second means for shortening a bicycle chain by removing links thereof;
- (c) manipulating said tool for positioning said third means in an operative, useful state, and utilizing said third means for removing a bicycle tire from the wheel thereof.

18. The method according to claim 17, further comprising:
- (d) using said first means for mounting a bicycle tire to a wheel-rim of a bicycle.

19. The method according to claim 18, wherein each of said steps (a) and (b) comprises holding said tool by a hand at said third means.

* * * * *